(12) United States Patent
Lynch

(10) Patent No.: US 11,114,221 B2
(45) Date of Patent: Sep. 7, 2021

(54) INTERLOCKING INSULATOR AND CONDUCTOR COVER FOR ELECTRICAL DISTRIBUTION SYSTEMS

(71) Applicant: Eco Electrical Systems, Reno, NV (US)

(72) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 0 days.

(21) Appl. No.: 16/779,169

(22) Filed: Jan. 31, 2020

(65) Prior Publication Data
US 2021/0241943 A1 Aug. 5, 2021

(51) Int. Cl.
*H01B 17/56* (2006.01)
*H02G 7/00* (2006.01)
*H01B 9/00* (2006.01)

(52) U.S. Cl.
CPC .......... *H01B 17/56* (2013.01); *H01B 9/008* (2013.01); *H02G 7/00* (2013.01)

(58) Field of Classification Search
CPC .......... H02G 7/00; H02G 15/22; H02G 15/20; H02G 15/02; H02G 15/06; H02G 7/05; H02G 7/12; H02G 7/20; H02G 9/00; H02G 9/10; H02G 7/02; H02G 7/08; H02G 3/26; H02G 7/18; H02G 3/081; H02G 3/14; H01R 4/66; H01R 4/643; H01B 7/00; H01B 17/34; H01B 17/36; H01B 7/1855; H01B 7/186; H01B 7/1865; H01B 7/187; H01B 7/1875; H01B 3/00; H01B 3/30; H01B 3/305; H01B 3/306; H01B 3/308; H01B 3/32; H01B 3/42; H01B 3/421; H01B 3/422; H01B 3/44; H01B 3/423; H01B 3/425; H01B 3/46; H01B 17/00; H01B 1/00; H01B 17/06; H01B 17/16; H01B 17/22; H01B 17/58; H01B 17/38; H02B 1/28; H05K 5/00; E04H 12/24; H01L 23/48
See application file for complete search history.

(56) References Cited

U.S. PATENT DOCUMENTS

| 4,280,013 A * | 7/1981 | Clutter ..................... H02G 7/00 174/139 |
| 6,730,852 B1 * | 5/2004 | Puigcerver ............. H01B 17/58 174/138 F |

(Continued)

*Primary Examiner* — Pete T Lee
(74) *Attorney, Agent, or Firm* — Patent Law Group; Brian D. Ogonowsky

(57) ABSTRACT

A dielectric cover for an insulator and conductor in an electrical distribution includes an insulator cover for covering the insulator, an arm for covering a portion of the conductor extending from under the insulator cover, and an arm adapter for securing the arm to the insulator cover. The arm adapter has a raised outer first rib, and the arm has a raised outer second rib and an inner first groove. The lineman positions the insulator cover and arm adapter over the insulator, such as by using a hotstick. Then, the lineman slides the arm down over the arm adapter so that the first rib enters the first groove to secure the arm to the arm adapter. Retaining pins are then inserted through holes in the insulator cover and arm to secure the dielectric cover over the insulator and conductor. The arm's raised second rib acts as a water dam to prevent flashovers.

18 Claims, 3 Drawing Sheets

(56) References Cited

U.S. PATENT DOCUMENTS 8,796,546 B2 * 8/2014 Lynch .................... H01B 17/00
                                                                                     174/5 R
2014/0262434 A1 * 9/2014 Stransky ................. H02G 7/00
                                                                                     174/135

* cited by examiner

INTERLOCKING INSULATOR AND CONDUCTOR COVER FOR ELECTRICAL DISTRIBUTION SYSTEMS

FIELD OF THE INVENTION

This invention relates to a dielectric cover for high voltage power line insulators and conductors (wires) and, in particular, to an insulator cover system that has an attachable arm for covering the conductor.

BACKGROUND

A wood or metal utility pole is typically used for supporting high voltage (HV) conductors (e.g., twisted wire strands) in a power distribution system. Each pole has secured to it one or more horizontal crossarms that support insulators which, in turn, support the HV conductors. The insulators are typically ceramic or a polymer. A conductor is typically secured over the top of each insulator, or along its side, via a metal tie wire, a bracket, or other means.

FIG. 1 is a perspective view of a top portion of a crossarm 10 of a utility pole. An insulator 12 is affixed to the crossarm 10 with a bolt 14. A generally horizontal conductor 16 seats in a top groove in the insulator 12 or along the neck area 18. There are many different designs of such insulators, and FIG. 1 shows a conventional design. A common feature of such insulators is a narrow neck area 18 and a wider skirt 20.

One known problem with exposed insulators and conductors is that large birds or other wildlife may alight on the grounded crossarm and short out phases or short a conductor to ground. Insulating (e.g., plastic) covers that cover the insulator 12 and a portion of the conductor 16 extending from the insulator 12 are known.

Some of the known covers are a single piece so are large and unwieldy when handled by a lineman due to the required length of the arms for covering the conductors.

Other covers may include a central portion for covering the insulator and attachable arms for covering the conductors. However, due to the arms being attachable to the center insulator cover, there is the possibility that water may seep between any gaps, such as by capillary action, and reduce the insulating properties of the cover. Any salt or contaminants in the air may combine with rain or snow to cause the water to be electrically conductive. Also, a water path may run along the length of the arms and over the insulator cover to create an electrical path between the conductor and the grounded crossarm, possibly causing an electrical flashover between the cover and the crossarm.

It would be desirable to provide a dielectric cover for an insulator and the conductor, where the cover is installed by the lineman in multiple pieces to simplify the handling and storage of the cover. The parts should be able to be installed using a hot stick so the conductors may be carrying a high voltage while the cover is installed.

It would also be desirable to somehow block a water path between the attachable arm and the insulator cover to prevent the formation of an electrically-conducting water path between the arm and the insulator cover.

Additionally, it would be desirable to easily secure the cover over the insulator and conductor to prevent it from being blown off in high winds, while at the same time allowing the connection between the arms and the insulator cover to be flexible to accommodate flexing of the conductor.

SUMMARY

A dielectric cover for a conventional insulator supporting a HV conductor is disclosed where the cover comprises an insulator cover, an arm adapter connected to the insulator cover, and an arm connected to the arm adapter for covering a length of the conductor extending away from the insulator. In one embodiment, two arm adapters are connected at opposite ends of the insulator cover, and an arm is connected to each arm adapter.

The arms are easily and reliably attached to the arm adapter in the field, and the assembled cover is easily secured in place over the insulator and conductor by retaining pins. The arm adapter may be connected to the insulator cover by the manufacturer, where the connection allows the arms to flex vertically and horizontally to adapt to the conductors flexing by weight or in high winds.

To prevent a water path forming between the arms and the insulator cover, to prevent a conductive path between the conductors and the grounded crossarm, a groove is molded into each arm near its end where the arm attaches to the arm adapter. The groove is formed on the inside surface of the arm and forms a raised outer rib on the outside of the arm. The arm adapter has a raised outer rib that enters the groove in the arm when the arm is slid down into position over the arm adapter. By the arm adapter's rib entering the groove, the arm and arm adapter are securely mated, which prevents the arm from laterally and rotationally shifting with respect to the insulator cover. The raised outer rib on the arm blocks the lateral flow of water, like a dam, that runs over the arm so as to prevent a water path between the far end of the arm (near the exposed conductor) and the insulator cover. Therefore, a conductive path between the conductor and the grounded crossarm, via the cover, is prevented in wet conditions.

The arm adapter is secured to the insulator cover by a plastic bolt or other attachment mechanism. The arm adapter is formed of a flexible polymer that allows a degree of horizontal and lateral movement to accommodate movement of the conductor in high winds or sagging of the conductor.

The attachment of the arms to the arm adapter will typically be performed by the lineman in the field after the insulator cover is secured over the insulator so that only relatively small pieces need to be handled by the lineman. The lineman can use a hotstick to install the cover while the conductors conduct a high voltage.

The cover may be secured over the insulator and conductor using retaining pins that pass through two opposite holes in the arms and the insulator cover. The pins pass under the conductor to prevent the cover from being blown off in high winds. The pins are manipulated using a hot stick. No tools are required.

Other features of the cover system are also described.

BRIEF DESCRIPTION OF THE DRAWINGS

Elements labeled with the same numerals in the various figures may be identical or similar.

DETAILED DESCRIPTION

Figure 1:
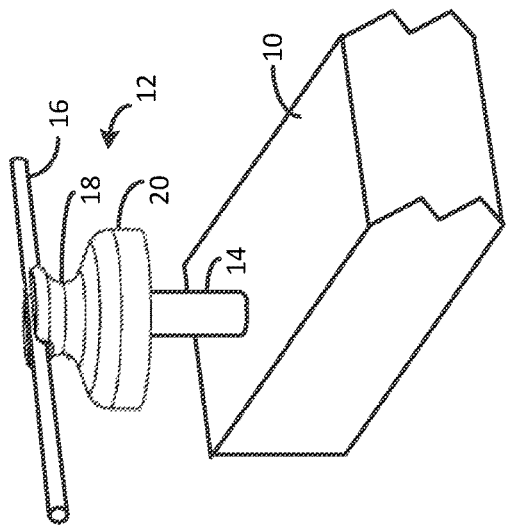
FIG. 1 is a perspective view of a crossarm of a utility pole supporting a conventional insulator and HV conductor.
Figure 2:
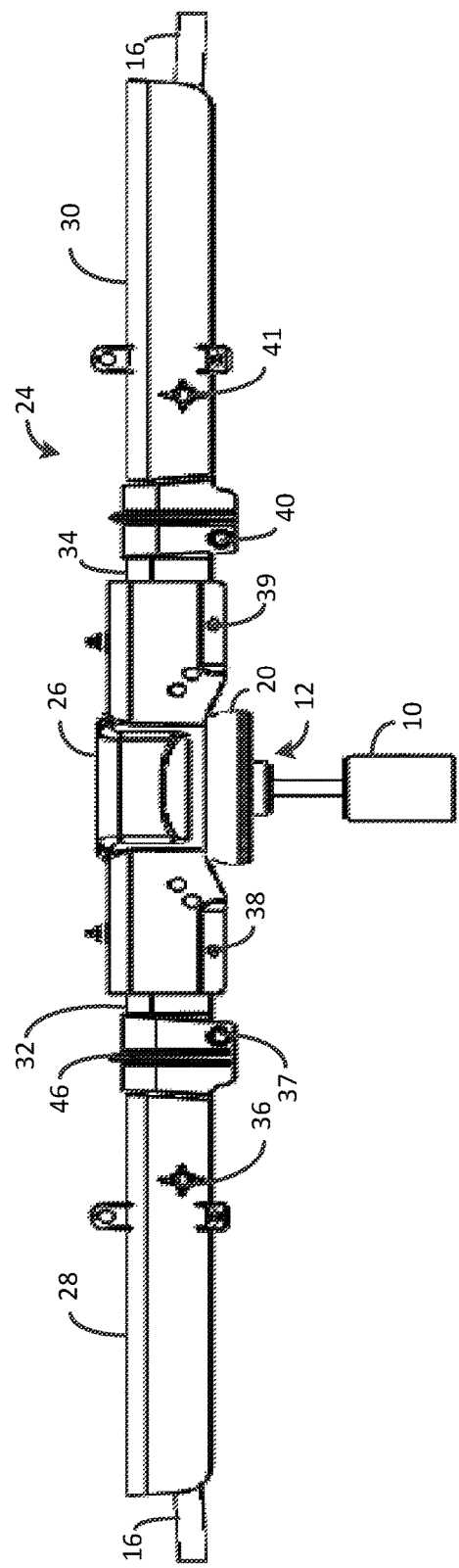
FIG. 2 is a side view of a dielectric cover, in accordance with one embodiment of the present invention, covering the insulator of FIG. 1 and a portion of the conductor for preventing outages from wildlife.

FIG. 2 is a side view of a dielectric cover 24, such as a molded plastic, in accordance with one embodiment of the present invention, covering the insulator 12 of FIG. 1 and a portion of the conductor 16 for protecting wildlife and preventing outages from wildlife. The cover 24 comprises an insulator cover 26, two identical attachable arms 28 and 30, and two arm adapters 32 and 34.

Holes 36-41 extend through the cover 24 and below the conductor 16. Pins, described later, are inserted through the holes 36-41 and pass through corresponding holes on the opposite side under the conductor 16, which secures the cover 24 in place. The pins and the cover 24 may be manipulated by a hotstick while high voltage is conducted by the conductor 16 so there is no loss of power to the consumer when the cover 24 is installed.

The bottom of the insulator cover 26 rests on the wide skirt 20 of the insulator 12, or the top of the insulator abuts against the ceiling of the insulator cover 26, depending on the type of insulator used.

Figure 3:
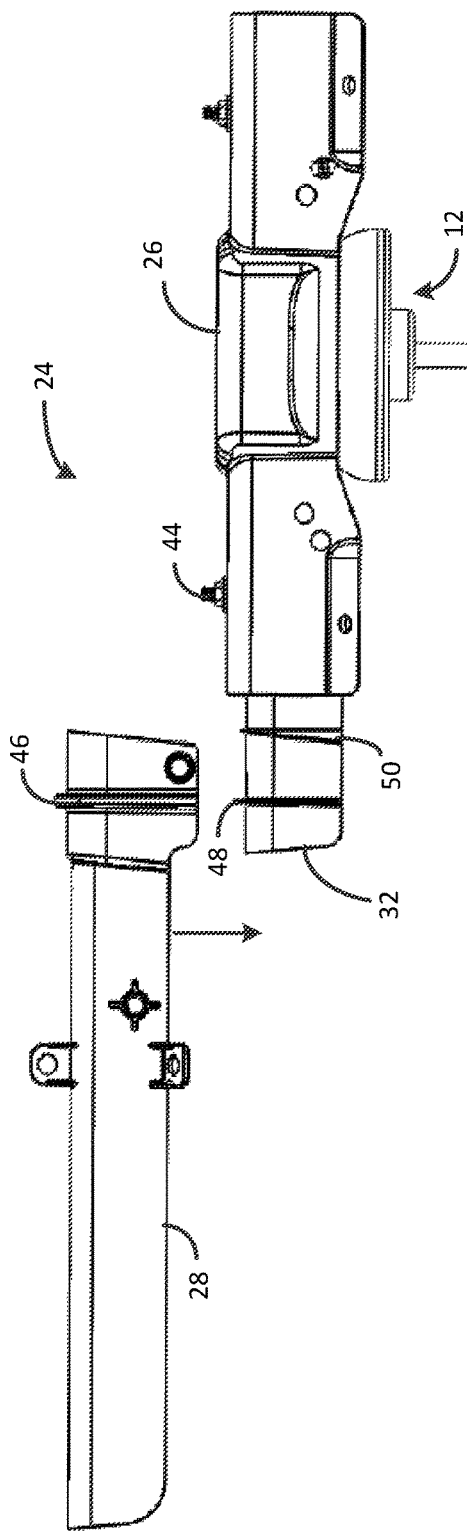
FIG. 3 is a side view of the attachable arm, arm adapter, and insulator cover after the arm adapter is attached to the insulator cover but before the arm is attached to the arm adapter. The lineman slides the arm over the arm adapter in the field using a hotstick if the conductor is energized.

FIG. 3 is a side view of the insulator cover 26 with the arm adapter 32 connected to the insulator cover 26 by a plastic bolt 44. A nut (not shown) screws onto the threads of the bolt 44 to secure the arm adapter 32 in place. The material forming the cover 24 is plastic and flexible. The single point of attachment of the arm adapter 32 allows some lateral movement of the arm adapter 32, and the flexibility allows some vertical movement for reducing stress when the conductor 16 (FIG. 2) sways in the wind and sags under its weight.

In FIG. 3, the left arm 28 is positioned by the lineman to be lowered over the arm adapter 32 so that an inner groove (forming an outer rib 46) of the arm 28 slides over a rib 48 molded into the arm adapter 32. This not only properly positions the arm 28 over the arm adapter 32 but the rib 46 acts as a water dam to block a water path from running along the arm 28 and onto the insulator cover 26. It also blocks water from entering the gap between the arm 28 and the arm adapter 32. Blocking the water prevents a flashover between the conductor 16 and the grounded crossarm due to a conductive water path between the end of the arm 28 and the insulator cover 26.

Figure 4:
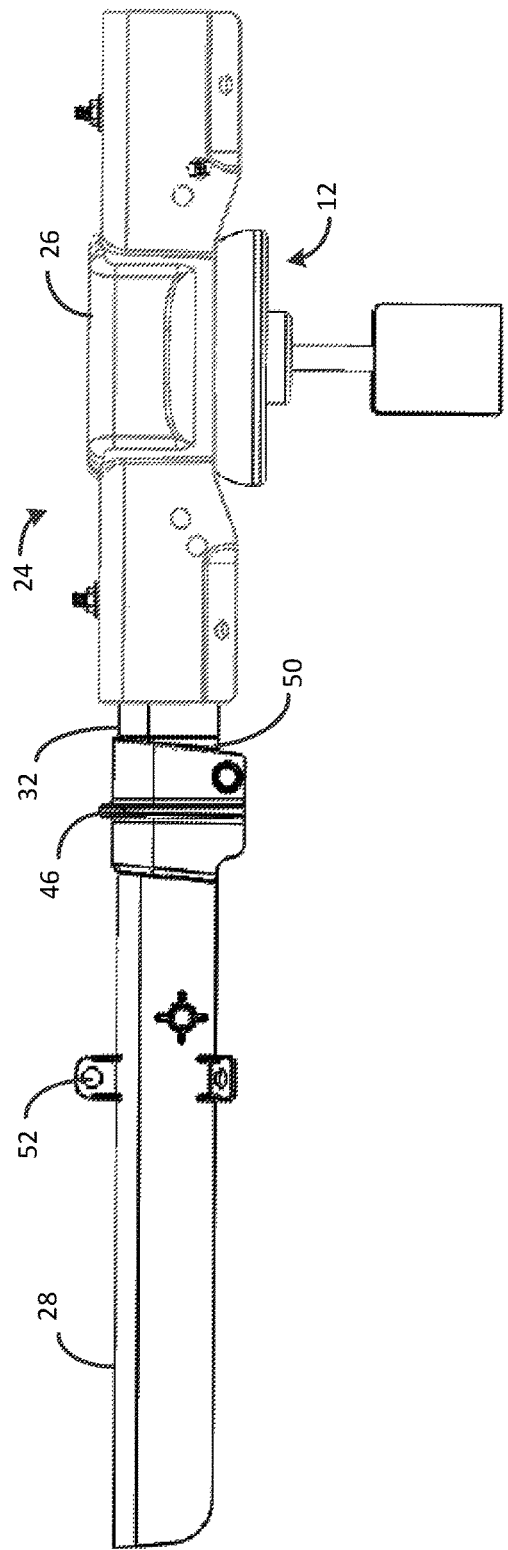
FIG. 4 shows the cover of FIG. 3 after the arm has been slid over the arm adapter.

The arm adapter 32 includes a second rib 50 that abuts the end of the arm 28 when the arm 28 is in place, as shown in FIG. 4. The second rib 50 has an inverted V-shape, and the end of the arm 28 is slanted to abut the second rib 50. This second rib 50 forms a water dam to water flowing from the insulator cover 26 toward the arm 28 to prevent a conductive water path between the insulator cover 26 and the arm 28, avoiding a flashover between the conductor and the grounded crossarm. The second rib 50 also prevents water entering the gap between the arm 28 and the arm adapter 32. The second rib 50 also reduces any lateral and rotational shifting of the arm 28 with respect to the arm adapter 32.

Holes 52 in each of the cover's pieces can be grabbed by a hotstick for installation while the conductor is energized.

Figure 5:
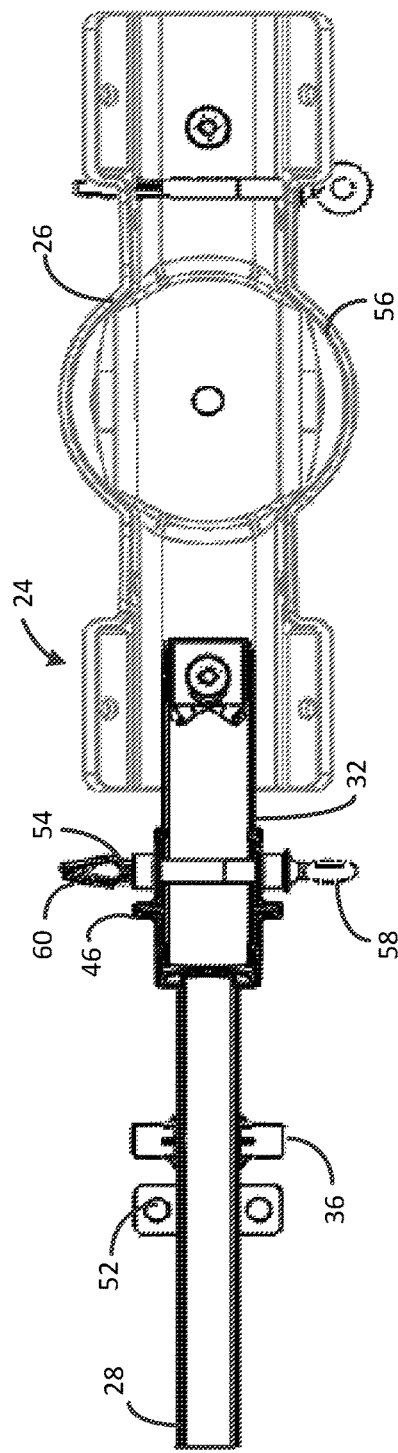
FIG. 5 is a bottom up view of the cover of FIGS. 2 and 4 with a retaining pin through the arm below the arm adapter to secure the arm over the conductor.

FIG. 5 is a bottom up view of the installed cover 24 showing a single retaining pin 54 pushed through opposing holes in the arm 28 and under the conductor to prevent the arm 28 from being blown off the conductor in high winds. Identical pins 54 are pushed through other holes (identified in FIG. 2) in the arm 28 and insulator cover 26 to extend under the conductor. FIG. 5 also shows the circular expanded area 56 at the center of the insulator cover 26 to accommodate the circular insulator on the crossarm. The expanded area 56 sits on top of the skirt 20 of the insulator 12 as shown in FIG. 2.

The pins 54 may be inserted using a hotstick engaging a ring 58 (a side view of the ring 58 is shown in FIG. 5). A resilient tip 60 has a low angle taper portion that allows easy insertion of the pins 54 through the holes until the pins 54 lock into place. A much steeper angle portion prevents the pins 54 from coming out under high winds. The pins 54 can be removed using a hotstick.

Figure 6:
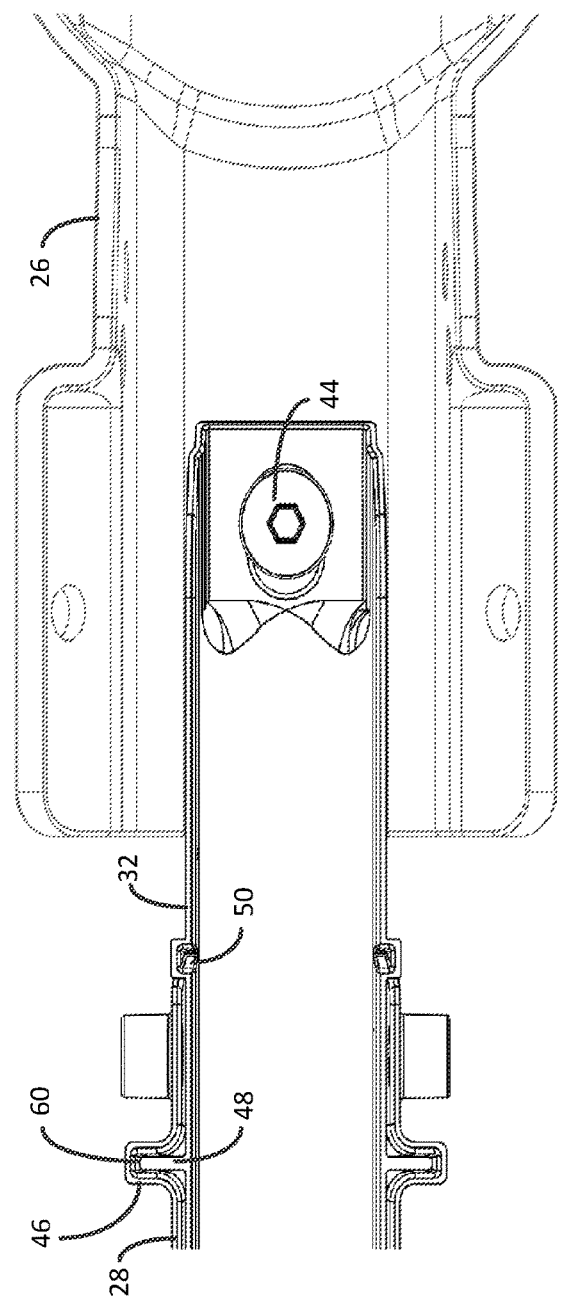
FIG. 6 is a close-up bottom up view of the cover of FIG. 5. A single attachment point of the arm adapter to the insulator cover allows some degree of horizontal and lateral movement of the arm adapter with respect to the insulator cover.

FIG. 6 is a close-up bottom up view of where the arm 28 fits over the arm adapter 32, showing the arm's rib 46, with an inner groove 60, and the rib 48 of the arm adapter 32 fitting into the groove 60. No retaining pin is shown in FIG. 6.

The right side of the cover 24 is identical to the left side.

In another embodiment, the arms 28 and 30 may be molded to have a slight downward angle or a slight U-shape to accommodate the natural sagging of the conductor.

In another embodiment, the arm adapters 32 and 34 are obviated by molding the insulator cover 26 to have the outer ribs 48 that the arms 28 and 30 slide over. However, this may result in the arms 28 and 32 being wider than desired and reduces the range of movement of the arms 28 and 32 to accommodate a moving conductor.

There are a variety of insulator shapes, and the insulator 12 of FIG. 1 is just an example. Other insulators are longer with sides having multiple ridges for higher voltages, and other insulators are simpler such as hemispherical with a connector, such as a vise, on top. The insulator cover 26 and arms 28/30 may be molded to accommodate any standard insulator shape while still retaining all aspects of the invention.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A dielectric cover for an insulator and conductor supported by the insulator, the conductor being for carrying a voltage, the insulator being supported by a support structure in an electrical distribution system, the cover comprising: an insulator cover configured to cover at least a top portion of the insulator; a first arm adapter that secures to the insulator cover, the first arm adapter having a raised outer first rib; and a first arm having a raised outer second rib and an inner first groove, wherein the first arm slides down over the first arm adapter so that the first rib enters the first groove to secure the first arm with respect to the first arm adapter, wherein the first arm adapter includes a raised outer third rib, wherein an outer surface of the raised outer third rib abuts against an end edge of the first arm after the first arm is secured with respect to the first arm adapter.

2. The cover of claim 1 further comprising holes in the first arm and the insulator cover for receiving retaining pins that extend under the conductor.

3. The cover of claim 1 wherein the first arm adapter is secured to the insulator cover by affixing an end of the first arm adapter to the insulator cover.

4. The cover of claim 3 wherein the end of the first arm adapter is secured to the insulator cover with a bolt.

5. The cover of claim 1 wherein the insulator cover includes a center expanded portion for accommodating at least a top portion of the insulator.

6. The cover of claim 1 wherein the insulator includes a narrow neck area and a wider skirt, wherein the insulator cover fits over the neck area but does not fit over the entire skirt.

7. The cover of claim 1 wherein the second rib of the first arm acts as a dam to substantially prevents a water path between the first arm and the insulator cover.

8. The cover of claim 1 where the first arm is straight.

9. The cover of claim 1 further comprising: a second arm adapter that secures to the insulator cover, the second arm adapter having an other raised outer third rib; and a second arm having an other raised outer fourth rib and an inner second groove, wherein the second arm slides down over the second arm adapter so that the other raised outer third rib enters the second groove to secure the second arm with respect to the second arm adapter.

10. The cover of claim 1 wherein the first arm adapter is secured to the insulator cover to allow vertical and lateral flexing of the first arm adapter.

11. The cover of claim 1 wherein the dielectric cover is secured over the insulator and conductor in the electrical distribution system.

12. The cover of claim 1 wherein the first arm adapter includes a raised outer third rib that abuts against an end of the first arm after the first arm is secured with respect to the first arm adapter, wherein the third rib has an inverted V-shape and the end of the first arm is slanted to abut against the third rib.

13. A method of installing a dielectric cover over an insulator and conductor supported by the insulator, the conductor being for carrying a voltage, the insulator being supported by a support structure in an electrical distribution system, the method comprising: positioning an insulator cover and a first arm adapter, secured to the insulator cover, over a top portion of the insulator, the first arm adapter having a raised outer first rib; providing a first arm having a raised outer second rib and an inner first groove; sliding the first arm down over the first arm adapter so that the first rib enters the first groove to secure the first arm with respect to the first arm adapter; securing the dielectric cover to the insulator and the conductor, wherein the first arm adapter includes a raised outer third rib, the method further comprising abutting an end edge of the first arm against an outer surface of the raised outer third rib after the first arm is secured with respect to the first arm adapter.

14. The method of claim 13 further comprising pushing retaining pins through holes in the insulator cover and first arm so that the pins are beneath the conductor, to prevent the dielectric cover from being vertically lifted off the insulator and conductor.

15. The method of claim 13 wherein the first arm adapter is secured to the insulator cover by affixing an end of the first arm adapter to the insulator cover.

16. The method of claim 13 wherein the insulator includes a narrow neck area and a wider skirt, wherein the insulator cover fits over the neck area but does not fit over the entire skirt.

17. The method of claim 13 where the first arm is straight.

18. The method of claim 13 further comprising: providing a second arm adapter, secured to the insulator cover, the second arm adapter having an other raised outer third rib; providing a second arm having an other raised outer fourth rib and an inner second groove; and sliding the second arm down over the second arm adapter so that the other raised outer third rib enters the second groove to secure the second arm with respect to the second arm adapter.

* * * * *